United States Patent
Cover

(10) Patent No.: US 9,112,356 B2
(45) Date of Patent: Aug. 18, 2015

(54) APPARATUS FOR STORING AND CHARGING MULTIPLE BATTERIES FOR POWER TOOLS

(71) Applicant: Joseph W. Cover, Dallas Center, IA (US)

(72) Inventor: Joseph W. Cover, Dallas Center, IA (US)

(\*) Notice: Subject to any disclaimer, the term of this patent is extended or adjusted under 35 U.S.C. 154(b) by 150 days.

(21) Appl. No.: 14/070,779

(22) Filed: Nov. 4, 2013

(65) Prior Publication Data

US 2015/0123614 A1     May 7, 2015

(51) Int. Cl.
*H02J 7/00* (2006.01)

(52) U.S. Cl.
CPC ............. *H02J 7/0003* (2013.01); *H02J 7/0042* (2013.01)

(58) Field of Classification Search
USPC ........................................................ 320/110
See application file for complete search history.

(56) References Cited

U.S. PATENT DOCUMENTS

| | | | |
|---|---|---|---|
| 4,739,242 | A | 4/1988 | McCarty et al. |
| 6,018,227 | A * | 1/2000 | Kumar et al. ................. 320/106 |
| 6,204,632 | B1 | 3/2001 | Nierescher et al. |
| 7,116,079 | B2 | 10/2006 | Bayne et al. |
| 7,388,352 | B2 | 6/2008 | Bayne et al. |
| 7,445,300 | B2 | 11/2008 | Collins et al. |
| 7,898,213 | B2 | 3/2011 | Law |
| 2008/0035507 | A1 | 2/2008 | Collister et al. |

OTHER PUBLICATIONS 3 photos of Applicant's (Joseph W. Cover)—portable power tool charging case.

\* cited by examiner

*Primary Examiner* — Sun Lin
(74) *Attorney, Agent, or Firm* — Sturm & Fix LLP

(57) ABSTRACT

A carrying case has portable hand tool battery chargers of different types mounted therein. The carrying case also has a central power strip for powering all of such multiple power tool chargers at the same time.

14 Claims, 5 Drawing Sheets

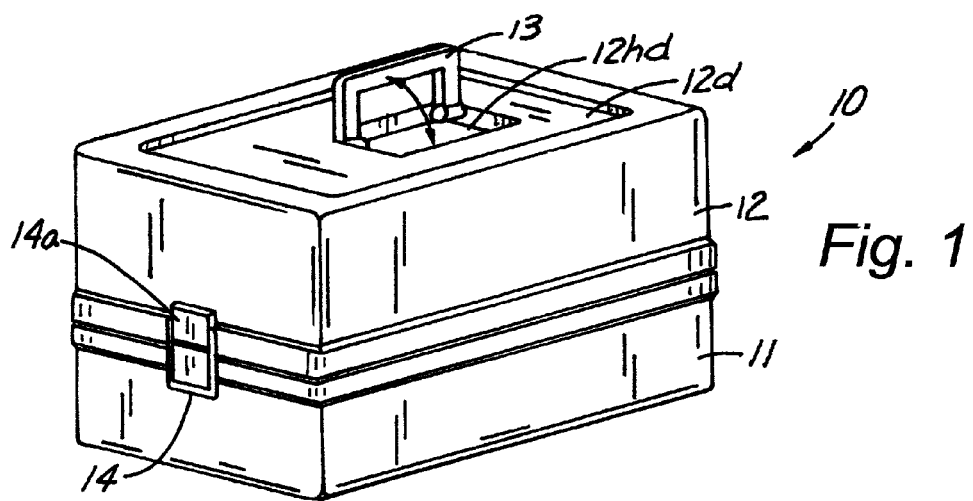
Fig. 1
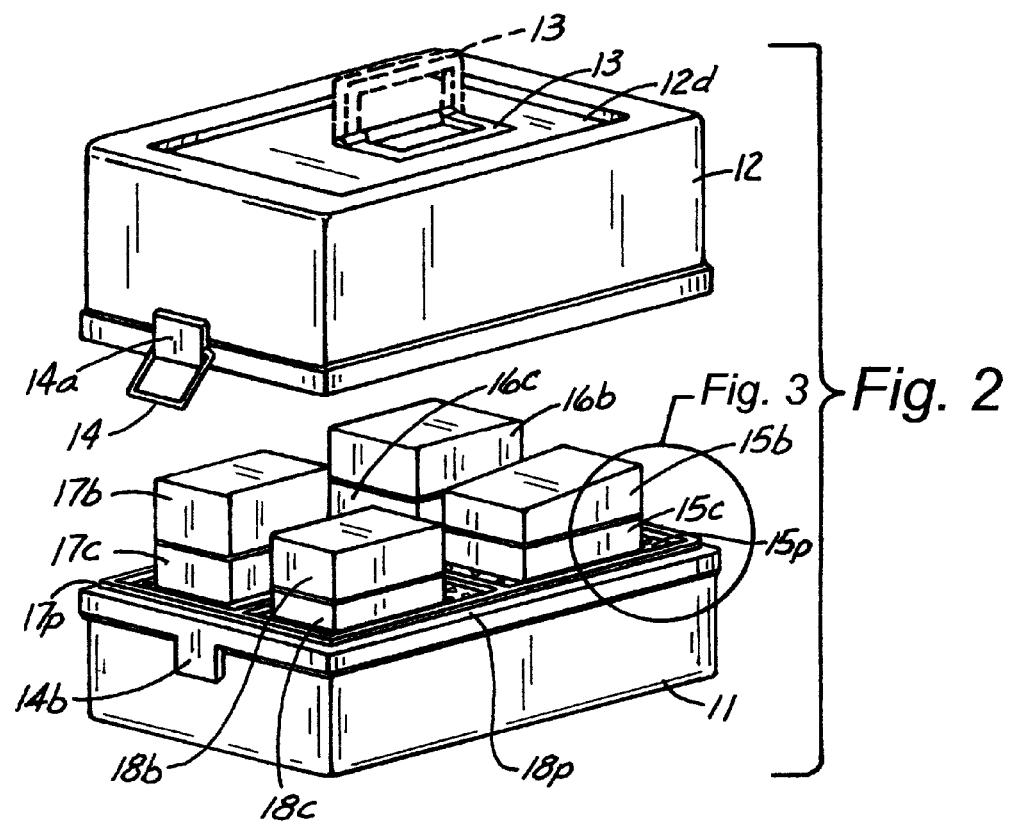
Fig. 2
Fig. 3

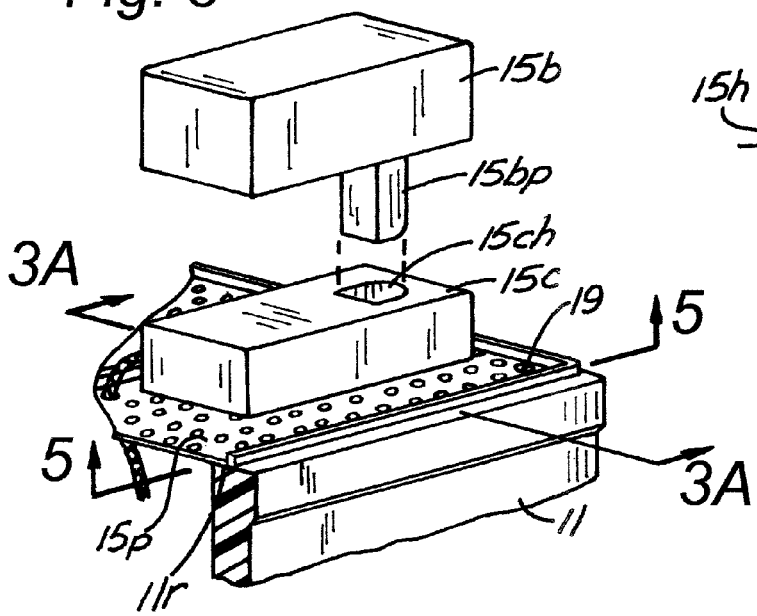
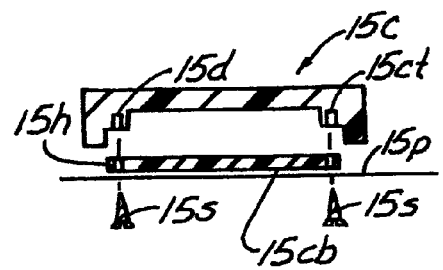
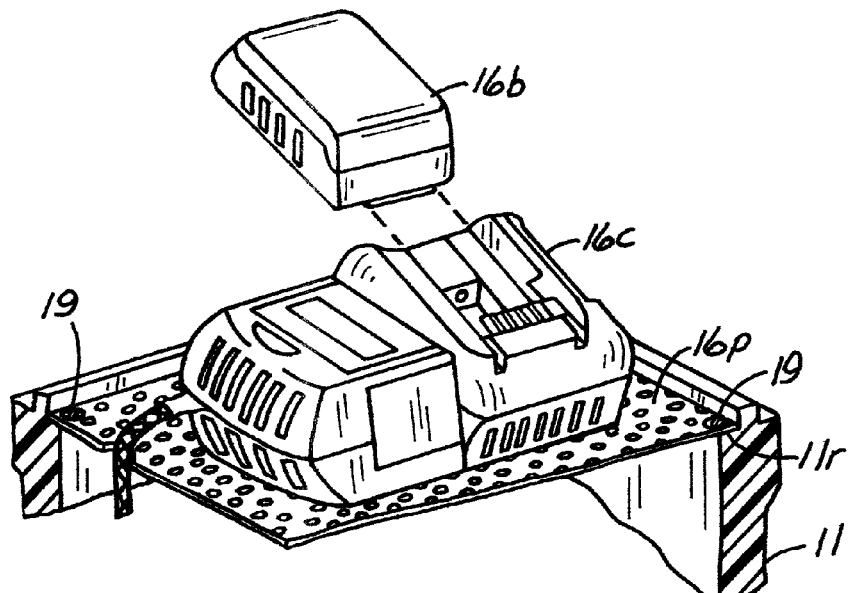

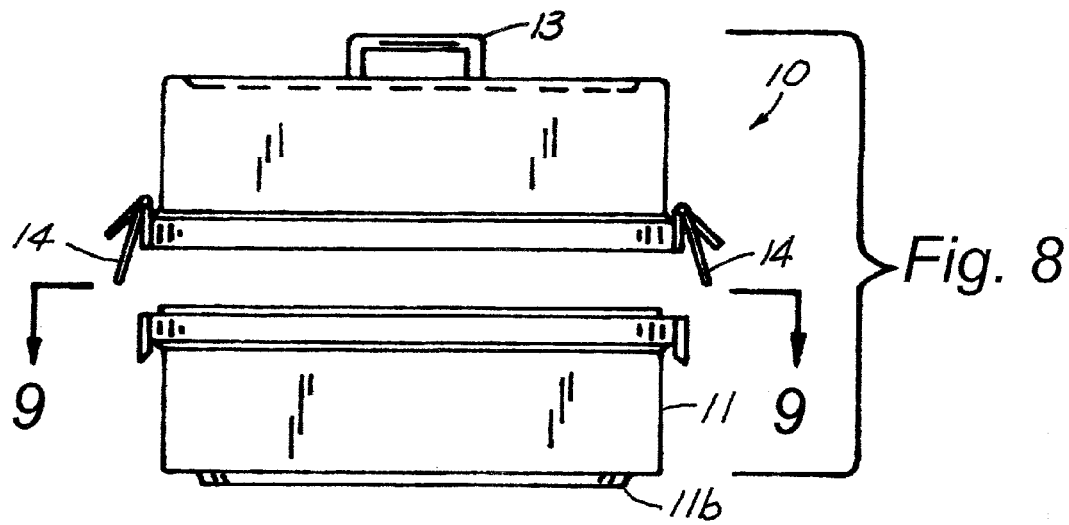
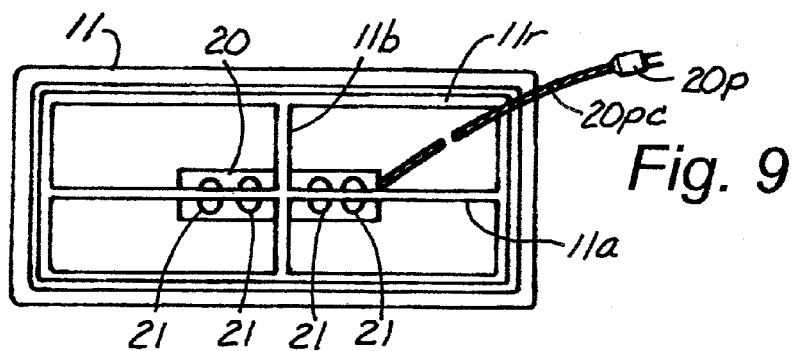
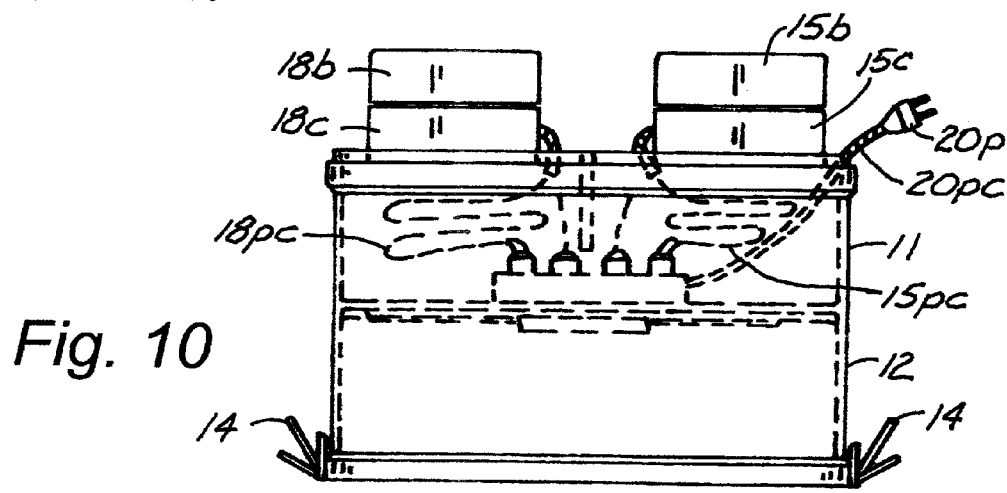

APPARATUS FOR STORING AND CHARGING MULTIPLE BATTERIES FOR POWER TOOLS

TECHNICAL FIELD

This invention relates generally to an apparatus for charging multiple hand tool batteries and more particularly to such an apparatus for use with battery chargers of different types and for facilitating easy transport of such battery chargers from place to place.

BACKGROUND

It is common for portable electric power tools that are battery powered to have duplicate interchangeable batteries so that once the battery in a respective power tool has lost its charge, a duplicate battery that is fully charged can be swapped out with the one that has the power used up. Otherwise the user would need to wait until the depleted battery was recharged, which can take an hour or more. Consequently users of this type of power tool usually bring a spare battery and a matching charger to the job site for charging duplicate batteries.

The more numerous the power hand tools being used the more chargers that are needed to be plugged into a source of power. This problem is exacerbated if the power tools are of different brands/types because each brand of power tools seems to have their own battery configuration and consequently their own matching charger configuration, i.e. there does not seem to be a universal battery/charger system for all brands of power tools. This situation can become unmanageable when numerous batteries of various types and matching chargers need that all need to be transported to and from the job site. Adding to the problem may be that there may not be a sufficient number of electrical outlets at the job site for plugging in all of the chargers needed.

Accordingly, there is a need for a solution to solve the aforementioned problems.

SUMMARY OF THE INVENTION

The aforementioned problems can be solved by putting an electrical power strip in a carrying case which has multiple chargers of different types mounted inside of that case, all plugged into that one power strip. That carrying case full of duplication batteries plugged into matching chargers can be conveniently taken to and from a job site. Once at the job site, the user merely needs to take a lid portion off of the case, plug in the power strip to a source of power and that will cause all of the chargers to begin charging all of the spare/duplicate batteries. So whenever the battery being used needs to be recharged, that battery is just swapped out with a fully charged battery in the case so that the fully charged battery can be used while the battery that needs to be recharged is being recharged.

BRIEF DESCRIPTION OF THE DRAWINGS

The above problems are at least partially solved through provision of the apparatus described in the following detailed description, particularly when studied in conjunction with the drawings, wherein:

FIG. 1 is a perspective view of a preferred embodiment of the apparatus for storing and charging multiple hand tool batteries;

FIG. 2 is an exploded perspective view of the present invention showing a lid portion removed to schematically show batteries and battery chargers for portable power tools;

FIG. 3 is an enlarged partial exploded perspective view of the part of the preferred embodiment shown inside of the circle of FIG. 2;

FIG. 3A is a cross sectional view taken along line 3A-3A of FIG. 3;

FIG. 4 is an enlarged partial perspective view of another type of charger and battery of the ones shown schematically in FIG. 2;

FIG. 8 is a side elevational exploded view of the case without the chargers in it;

FIG. 9 is a view taken along line 9-9 of FIG. 8 showing the power strip and a lattice structure to permit perforated mounting plates to be secured to the base portion; and FIG. 10 is side elevational view with the base portion nested in a turned over lid portion, with two of the batteries and battery chargers showing in solid lines while the power strip with battery charger cords plugged therein are shown in dashed lines.

Figure 5:
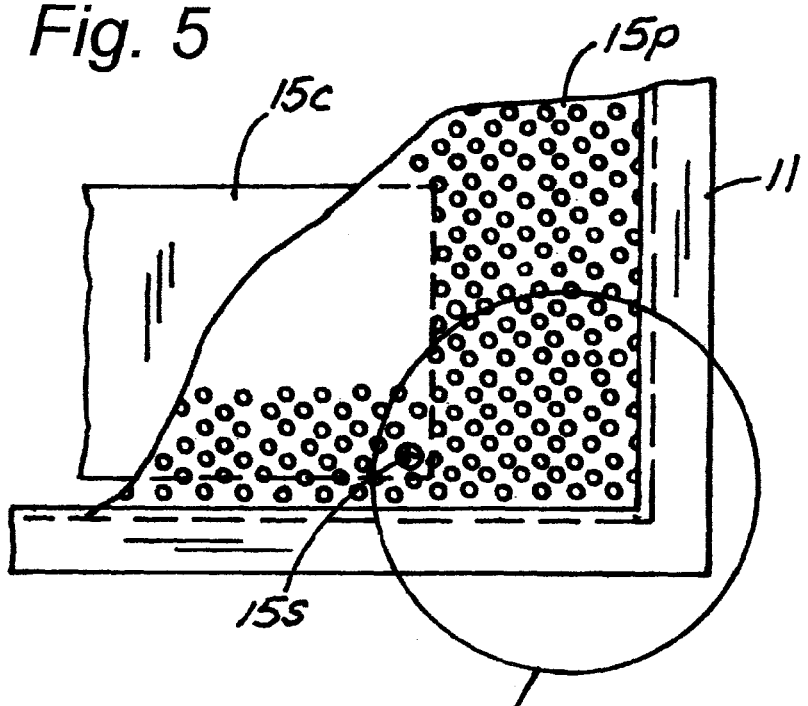
FIG. 5 is a view taken along line 5-5 of FIG. 3 showing one of the screws that pass through one of the holes in a perforated plate and into a threaded hole in the bottom of one of the battery chargers.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIG. 1 shows a case 10 for holding, carrying, storing and charging portable hand tool batteries. The case 10 has a base portion 11, a lid portion 12 and a handle 13 pivotally attached to the top of the lid portion 12.

FIGS. 1 and 2 show an over center buckle attachment U-shaped rod portion 14 is attached with member 14*a* on the lid portion 12 and complementary attachment portion 14*b* on the base portion 11. It will be understood to those skilled in this art that this over center buckle attachment is well known and it is also to be understood that other types of attachment/detaching mechanisms could be used instead of the one shown in these drawings.

A main depression 12d in lid portion 12 also has a handle depression 12hd in it for selective reception of the handle 13 when it is folded from the position shown in dashed lines in FIG. 2 to the solid line position shown in FIG. 2. These depressions are important in order to use the nesting position which will later be discussed with respect to FIG. 10.

Looking again at FIG. 2, a plurality of battery chargers 15c, 16c, 17c and 18c are attached to respective perforated plates 15p, 16p, 17p and 18p. Plate 16p is not visible in FIG. 2, but is visible in FIG. 4. It is to be understood that in the embodiment 10 shown all of the plates 15p, 16p, 17p and 18p are essentially identical, though it is not a requirement that they all be identical. They are all fastened to a ridge 11r (FIG. 4) on base portion 11 and secured thereto with screws 19 after each individual charger 15c, 16c, 17c and 18c is attached to respective plates 15p, 16p, 17p and 18p. Brace members 11a and 11b (FIG. 9) are connected to the ridge 11r and further support the respective plates 15p, 16p, 17p and 18p. More screws 19 can extend through brace members 11a and 11b if desired.

The plurality of battery chargers 15c, 16c, 17c and 18c are all different in the embodiment shown, though some could be identical to each other. Accordingly the batteries 15b, 16b, 17b and 18b that are shown plugged into respective chargers 15c, 16c, 17c and 18c are of different types that match the type of charger 15c, 16c, 17c and 18c that each is plugged into respectively.

Looking to FIG. 3A, battery chargers like charger 15c typically have plastic housings with a top part 15ct and a bottom part 15cb. The bottom part 15cb is typically attached to the top part by at least four threaded fasteners 15s which enter a hole 15h in the bottom part 15cb and are threaded into a threaded depression 15cd in the top part of the charger housing 15ct. For each brand or type of charger, these holes are located in different places and are different distances apart. That is why it is important that the mounting plate 15p have evenly spaced holes 15ph (FIG. 6) that are spaced apart by a distance within a range of $3/16^{th}$ to $1/2$ of an inch. With that spacing there will always be a hole 15ph close enough to the hole 15h in the bottom plate 15cb and threaded depression 15ct in the top part 15ct of the housing of charger 15c.

Figure 6:
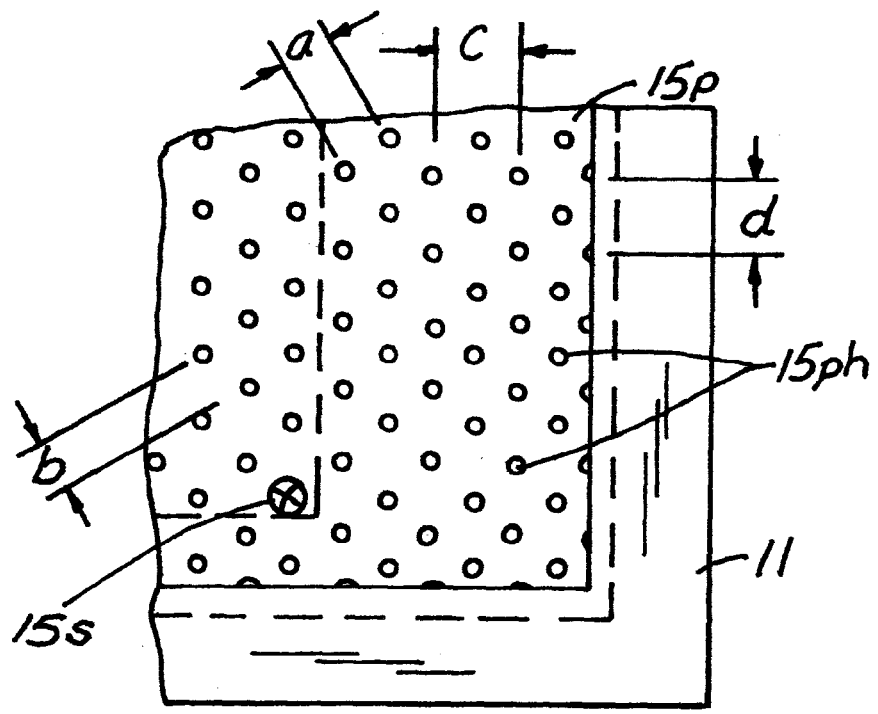
FIG. 6 is an enlarged partial view of the part of the preferred embodiment shown inside of the circle of FIG. 5, showing the perforations in the sheet that mounts the chargers to the base portion of the case.

FIG. 6 shows that distances a, b, c and d must always be within the specified range of $3/16^{th}$ to $1/2$ of an inch for this feature of the invention to work properly. That is not to say that other claims of this patent document which do not specify this critical distance must have a perforated place with openings within this critical distance, but only the attached claim(s) that specify this critical range are to be construed in this limited way.

FIG. 3 shows a battery charger 15c attached to a perforated plate 15p. The charger 15c has a top hole 15ch in it for reception of a projection 15bp of a battery 15b. This battery/charger 15b/15c is of a well known type.

FIG. 4 shows a battery 16b and charger 16c of a type different than the charger 15b/15c shown in FIG. 3. The battery 16b slides into and out of grooves in the top of the charger 16c. This battery/charger 16b/16c is also of a well known type different than battery/charger 15b/15c.

FIG. 8 shows the lid portion 12 lifted off of the base portion 11 without the chargers/batteries 15c, 16c, 17c and 18c/15b, 16b, 17b and 18b in the case 10. A projection 11p is disposed on the bottom of the base portion 11 for nesting into the depression 12d (FIGS. 1 and 10) in the top portion 12 when the case 10 is being used at a job site.

Figure 7:
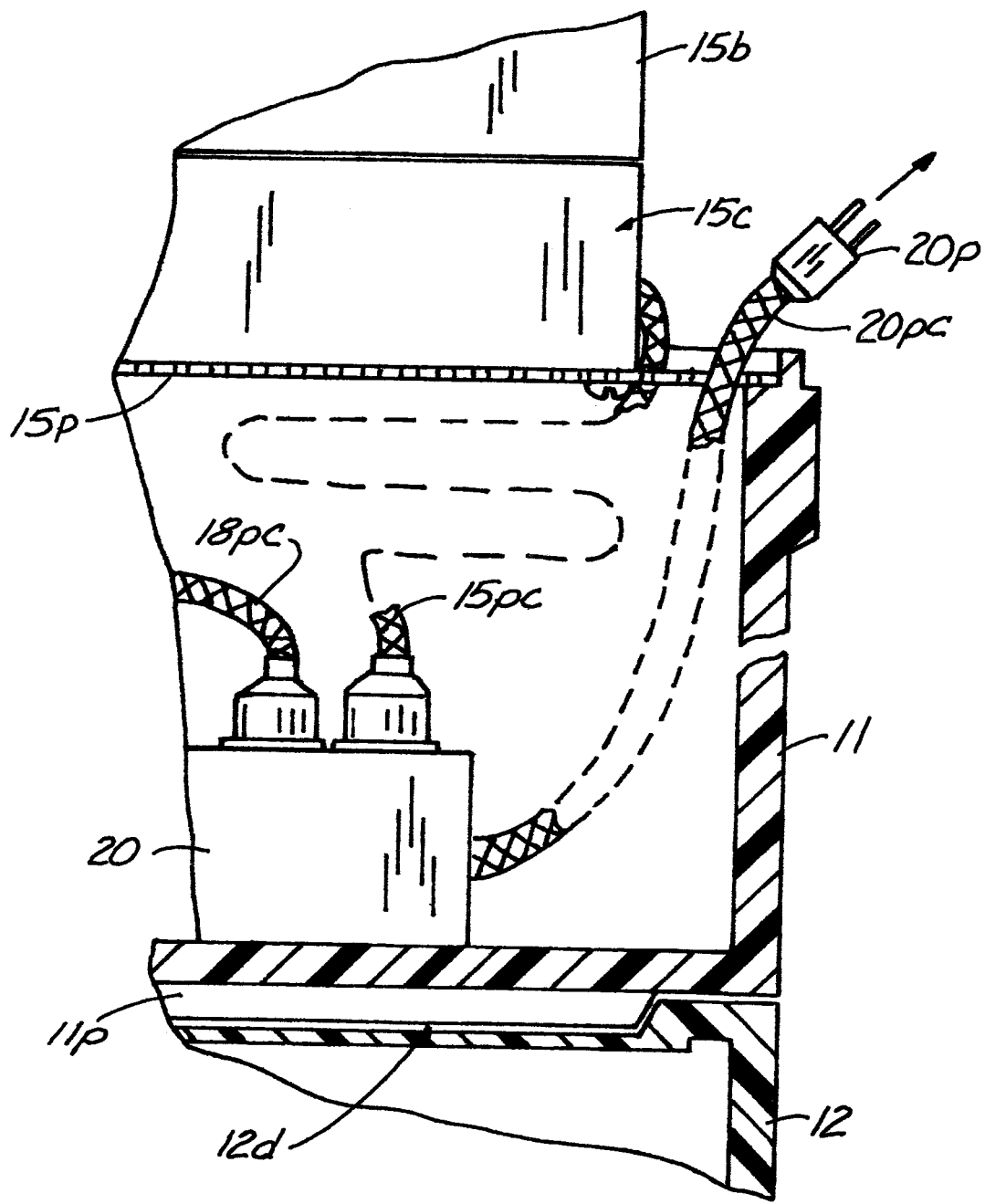
FIG. 7 is an enlarged partial cross sectional view of the base portion nested on the lid portion and showing how the power strip cord extends from the base portion and shows one of the batteries attached to one of the chargers.

Looking to FIGS. 7, 9 and 10, power strip 20 has a plurality of outlets 21 for plugging in 120 volt plugs on power cords (like power cords 15pc and 18pc shown in FIG. 10) from each of the respective chargers 15c, 16c, 17c and 18c. The power strip 20 has its own power cord 20pc and plug 20p to be plugged into an electrical outlet at a job site to ultimately power all of the chargers 15c, 16c, 17c and 18c.

In use, the case 10 (FIG. 1) with all of the chargers/batteries 15c, 16c, 17c and 18c/15b, 16b, 17b and 18b would be taken to a job site along with all of the power tools (not shown) that would have fully charged batteries in them. Once at the job site, the user would open the case 10, remove the lid portion as shown in FIG. 2, flip the lid portion over as shown in FIG. 10 and put the base portion 12 on top of the base portion, nesting the base projection 11p into the lid portion depression 12d as shown in FIG. 7. At that time the case 10 will look as shown in FIG. 10. The plug 20p would then be plugged in to an electrical outlet to power all of the chargers 15c, 16c, 17c and 18c. People using the power tools will eventually end up with batteries that need to be charged to operate the power tools properly. When that occurs, the user of each respective power tool will go to the case 10 as shown in FIG. 10 and "swap out" one of the charged batteries 15b, 16b, 17b and 18b of the proper type with the run down battery of that same type in that person's hand power tool. The user can then proceed to use that power tool with the fully charged battery while the run down battery is being charged in the case 10 in the FIG. 10 configuration.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. An apparatus for storing and charging multiple hand tool batteries comprising:
    a carrying case having a base portion with a top and a bottom, and a lid portion, the lid portion having a first position attached to and covering a top of the base portion and a second position not covering the top portion of the top of the base portion;
    a first support plate and a second support plate disposed in the top of the base portion;
    a first battery charger of a first type being operatively attached to the first support plate;
    a second battery charger of a second type being operatively attached to the second support plate; and
    a power strip disposed in the base portion below the first support plate and the second support plate for permitting the first battery charger and the second battery charger to be plugged into the power strip and wherein the power strip has a cord and a plug for permitting the power strip to be plugged into a source of electric power.

2. The apparatus for storing and charging multiple hand tool batteries of claim 1, further comprising:
    a third support plate and a fourth support plate disposed in the top of the base portion;
    a third battery charger of a third type being operatively attached to the first support plate; and
    a fourth battery charger of a fourth type being operatively attached to the second support plate.

3. The apparatus for storing and charging multiple hand tool batteries of claim 1 wherein:
    the first battery charger has holes in its bottom thereof for reception of threaded fasteners; and the first support plate has a plurality of evenly spaced universal grid of holes there through which are within a range of three sixteenths (3/16) to one half (1/2) of an inch apart so that there will be a hole close enough to match at least four holes in a bottom of the first battery charger; and threaded fasteners disposed through holes in the first support plate and into holes in the bottom of the first battery charger.

4. The apparatus for storing and charging multiple hand tool batteries of claim 3 wherein:

the second battery charger has holes in its bottom thereof for reception of threaded fasteners;

the second support plate has a plurality of evenly spaced universal grid of holes there through which are within a range of three sixteenths (3/16) to one half (1/2) of an inch apart so that there will be a hole close enough to match at least four holes in a bottom of the second battery charger; and threaded fasteners disposed through holes in the second support plate and into holes in the bottom of the second battery charger.

5. The apparatus for storing and charging multiple hand tool batteries of claim 1 wherein a top portion of the lid portion has a handle thereon for facilitating transportation of the apparatus from place to place when the top portion of the top of the base portion is fixed with respect to a bottom portion of the lid portion.

6. The apparatus for storing and charging multiple hand tool batteries of claim 1 further comprising a first hand tool battery of a first type matched to the first battery charger of the first type and disposed in the first battery charger.

7. The apparatus for storing and charging multiple hand tool batteries of claim 6 wherein the first hand tool battery of the first type has a male contact portion that slides towards or away from a top surface of the first battery charger into or out of a female contact portion of the first battery charger.

8. The apparatus for storing and charging multiple hand tool batteries of claim 1 further comprising a second hand tool battery of a second type matched to the second battery charger of the second type and disposed in the second battery charger.

9. The apparatus for storing and charging multiple hand tool batteries of claim 8 wherein the second hand tool battery of the second type has a male contact portion that slides in a direction transverse to a top surface of the second battery charger into or out of a contact portion of the second battery charger.

10. The apparatus for storing and charging multiple hand tool batteries of claim 1 wherein a projection on one of the base portion and the lid portion and a complementary depression on the other one of the base portion and the lid portion nest together when the base portion is placed on the lid portion thereby the lid portion is turned over and placed on a support surface.

11. The apparatus for storing and charging multiple hand tool batteries of claim 1 wherein the first support plate and the second support plate are removeably secured to the top of the base portion after the first battery charger and the second battery charger are attached thereto.

12. The apparatus for storing and charging multiple hand tool batteries of claim 1 wherein the lid portion has a handle pivotally attached to a top part of the lid portion.

13. The apparatus for storing and charging multiple hand tool batteries of claim 1 wherein the lid portion is removeably attached to the base portion.

14. The apparatus for storing and charging multiple hand tool batteries of claim 1 including means for selectively attaching the lid portion to the base portion when it is desired to transport the apparatus from place to place and detaching the lid portion from the base portion during use, said means also providing a way to detach the lid portion from the base portion when the apparatus is being used to charge batteries at a job site.

* * * * *